United States Patent
Wang et al.

(10) Patent No.: US 12,273,571 B2
(45) Date of Patent: Apr. 8, 2025

(54) METHODS AND SYSTEMS FOR SECURE LIVESTREAMING

(71) Applicant: KEYWESTTECH LLC., Rolling Meadows, IL (US)

(72) Inventors: Xuefei Wang, Hangzhou (CN); Yang Xu, Hangzhou (CN); Fangming Chen, Hangzhou (CN); Nan Hua, Hangzhou (CN)

(73) Assignee: KEYWESTTECH LLC., Rolling Meadows, IL (US)

( * ) Notice: Subject to any disclaimer, the term of this patent is extended or adjusted under 35 U.S.C. 154(b) by 4 days.

(21) Appl. No.: 18/171,652

(22) Filed: Feb. 20, 2023

(65) Prior Publication Data

US 2024/0283987 A1 Aug. 22, 2024

(51) Int. Cl.
*H04N 21/233* (2011.01)
*H04N 21/2187* (2011.01)
*H04N 21/81* (2011.01)

(52) U.S. Cl.
CPC ....... *H04N 21/233* (2013.01); *H04N 21/2187* (2013.01); *H04N 21/8146* (2013.01)

(58) Field of Classification Search
CPC ............. H04N 21/233; H04N 21/2187; H04N 21/8146
See application file for complete search history.

(56) References Cited

U.S. PATENT DOCUMENTS

| | | | |
|---|---|---|---|
| 2011/0173102 A1* | 7/2011 | Burns | H04N 21/47815 705/26.7 |
| 2016/0191964 A1* | 6/2016 | Corwin | H04N 21/4758 725/24 |
| 2016/0330522 A1* | 11/2016 | Newell | G06F 21/604 |
| 2018/0027307 A1* | 1/2018 | Ni | H04N 21/44218 345/419 |
| 2022/0070628 A1* | 3/2022 | Frolovichev | H04H 20/91 |
| 2022/0382988 A1* | 12/2022 | Frost | G06N 5/01 |
| 2023/0023085 A1* | 1/2023 | Zhu | H04N 21/4884 |
| 2023/0199042 A1* | 6/2023 | Benson | H04L 65/1069 709/204 |

* cited by examiner

*Primary Examiner* — Randy A Flynn
(74) *Attorney, Agent, or Firm* — METIS IP LLC

(57) ABSTRACT

The embodiments of the present disclosure provide methods and systems for livestreaming. The method may be implemented on a server. The method may include: obtaining standard content of a livestreaming unit; determining, based on the standard content, a first audio of livestreaming of the standard content by a virtual person and a first driving parameter corresponding to the first audio; and sending the first audio and the first driving parameter to at least one client terminal to direct the at least one client terminal to perform the livestreaming of the standard content on the livestreaming unit through the virtual person.

13 Claims, 6 Drawing Sheets

METHODS AND SYSTEMS FOR SECURE LIVESTREAMING

TECHNICAL FIELD

The present disclosure relates to the field of livestreaming, and in particular, to methods and systems for livestreaming.

BACKGROUND

With the continuous development of audio and video technology, online livestreaming has become more and more widely used in scenarios such as e-commerce, entertainment, education, etc. At present, applications are still mainly livestreaming scenarios of real persons although more and more applications of virtual persons are appearing in livestreaming. Compared with live-person livestreaming, there is much room for improvement in interaction efficiency and interest between a virtual person and a user in virtual-person livestreaming.

Therefore, it is desirable to provide methods and systems for livestreaming, which can improve the interaction efficiency and interest between the virtual person and the user, thereby improving the user experience.

SUMMARY

One of the embodiments of the present disclosure provides a method for livestreaming implemented on a server including one or more processors and one or more storage devices. The method may include: obtaining standard content of a livestreaming unit; determining, based on the standard content, a first audio of livestreaming of the standard content by a virtual person and a first driving parameter corresponding to the first audio; and sending the first audio and the first driving parameter to at least one client terminal to direct the at least one client terminal to perform the livestreaming of the standard content on the livestreaming unit through the virtual person.

One of the embodiments of the present disclosure provides a method for livestreaming implemented on a client terminal including one or more processors and one or more storage devices. The method may include: obtaining a first audio of livestreaming of standard content by a virtual person and a first driving parameter corresponding to the first audio, the standard content being livestreaming content of a livestreaming unit; and performing, based on the first audio and the first driving parameter, the livestreaming of the standard content on the livestreaming unit through the virtual person.

One of the embodiments of the present disclosure provides a system for livestreaming. The system may include: at least one storage device configured to store a set of instructions; and at least one processor configured to communicate with the at least one storage device, wherein when executing the set of instructions, the at least one processor is configured to cause the system to perform operations including: obtaining standard content of a livestreaming unit; determining, based on the standard content, a first audio of livestreaming of the standard content by a virtual person and a first driving parameter corresponding to the first audio; and sending the first audio and the first driving parameter to at least one client terminal to direct the at least one client terminal to perform the livestreaming of the standard content on the livestreaming unit through the virtual person.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
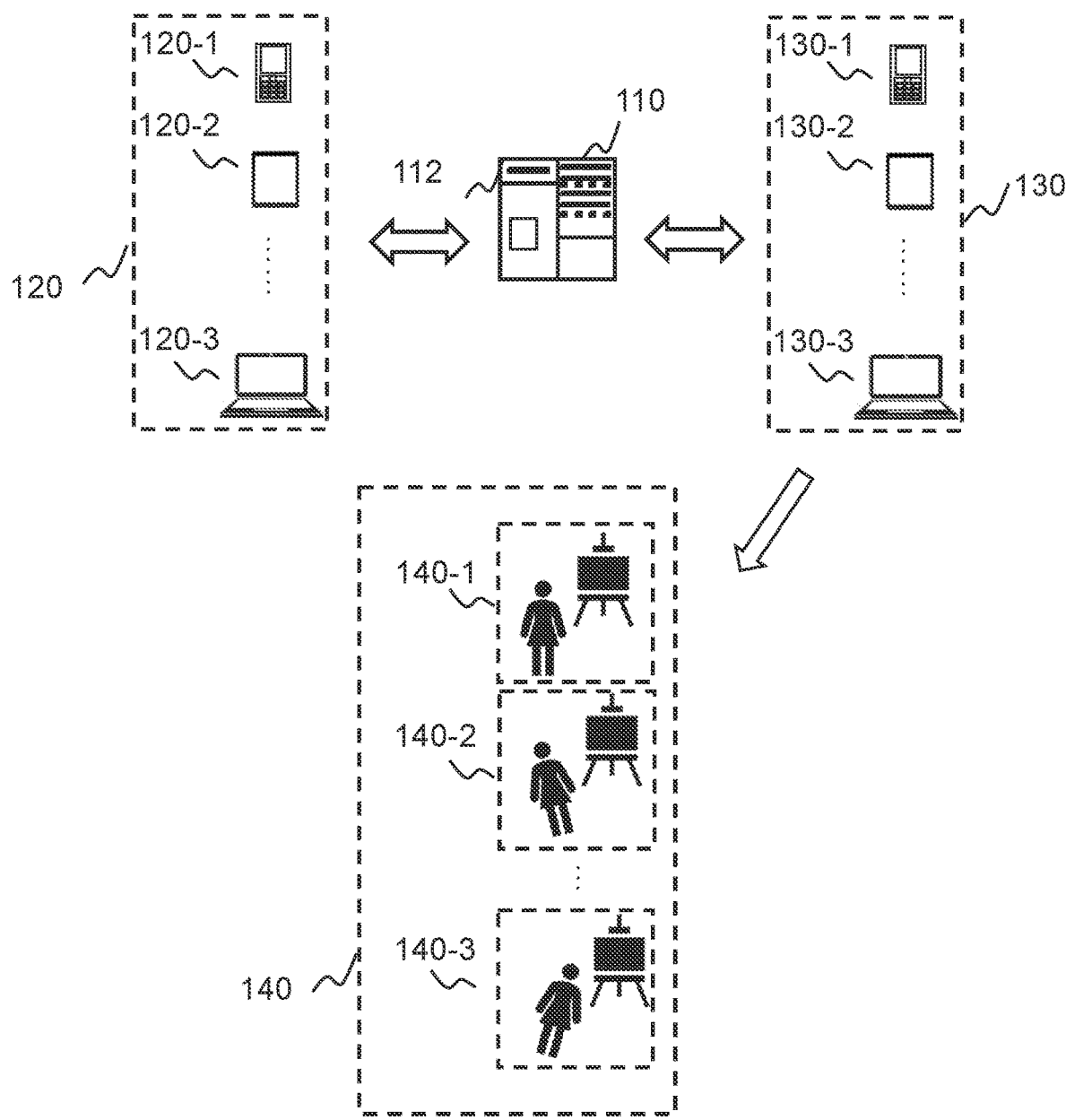
FIG. 1 is a schematic diagram illustrating an application scenario of a system for livestreaming according to some embodiments of the present disclosure.

In order to more clearly illustrate the technical solutions related to the embodiments of the present disclosure, a brief introduction of the drawings referring to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an application scenario of a system for livestreaming according to some embodiments of the present disclosure. As shown in FIG. 1, the application scenario 100 of the system for livestreaming may include a server 110, an anchor terminal 120, a client terminal 130, or the like, or any combination thereof.

In some embodiments, the server 110 may process information and/or data related to the application scenario 100 of a system for livestreaming through a virtual person to perform one or more functions described in the present disclosure. In some embodiments, the server 110 may be configured to manage resources and process data and/or information from at least one component of the system or an external data source (e.g., a cloud data center). The server 110 may execute program instructions based on the data, information and/or processing results to perform one or more functions described in the present disclosure. The server 110 may be configured to handle questions, determine information and/or data, or the like. For example, the server 110 may determine, based on standard content, a first audio of livestreaming of the standard content by the virtual person and a first driving parameter corresponding to the first audio. As another example, the server 110 may determine a target answer to a target question. As another example, the server 110 may be configured to receive and/or distribute information and/or data. For example, the server 110 may send the first audio and the first driving parameter to at least one client terminal.

In some embodiments, the server 110 may include a processor 112. The processor 112 may process data and/or information obtained from other devices or system components. The processor 112 may execute program instructions based on the data, information and/or processing results to perform one or more of functions described herein. In some embodiments, the processor 112 may include one or more sub-processing devices (e.g., a single-core processing device or a multi-core processing device).

A user terminal may refer to a device or other entity used by a user and related to the application scenario 100 of the system for livestreaming through the virtual person. The user may be anyone who leads the livestreaming, or watches the livestreaming, etc. The user terminal may include the anchor terminal 120 and/or the client terminal 130.

In some embodiments, the anchor terminal 120 may be configured to input a requirement of the livestreaming, for example, the standard content of a livestreaming unit, etc. The person leading the livestreaming may input the requirement of the livestreaming through the anchor terminal 120. In some embodiments, the anchor terminal 120 may be other devices with input and/or output functions, such as a mobile device 120-1, a tablet computer 120-2, a laptop computer 120-3, or the like, or any combination thereof. It should be noted that the anchor terminal 120 in the application scenario 100 of the system for livestreaming is not necessary. The anchor terminal 120 may be a component of the server 110. The person leading the livestreaming may directly input the requirement of the livestreaming through the server 110.

In some embodiments, the client terminal 130 may be used to perform livestreaming through the virtual person, receive a bullet comment sent by a user, etc. A person watching the livestreaming may watch the livestreaming, send a bullet comment, etc. through the client terminal 130. In some embodiments, the client terminal 130 may process data obtained from other terminals. For example, based on the first audio and the first driving parameter, the client terminal 130 may perform livestreaming on the livestreaming unit through the virtual person through picture rendering, audio and video synthesis, or the like. In some embodiments, the client terminal 130 may be other devices with input and/or output functions, such as a mobile device 130-1, a tablet computer 130-2, a laptop computer 130-3, or the like, or any combination thereof.

In some embodiments, the anchor terminal 120, the client terminal 130, etc. may include other smart terminals, such as a wearable smart terminal, etc.

The above examples are merely used to illustrate universality of a scope of devices such as the anchor terminal 120, the client terminal 130, etc., and not intended to limit the scope thereof.

In some embodiments, the content 140 of the livestreaming by the virtual person corresponding to different client terminals 130 may be the same or different. As shown in FIG. 1, the content 140 of the livestreaming of the virtual person may include livestreaming content 140-1, livestreaming content 140-2, livestreaming content 140-3, or the like. The livestreaming content 140-1, the livestreaming content 140-2, and the livestreaming content 140-3 may be livestreaming content corresponding to the different client terminals 130 respectively. The livestreaming content 140-1, the livestreaming content 140-2, and the livestreaming content 140-3, etc. may be the same or different. For example, the livestreaming content 140-1 may be standard content of the livestreaming by the virtual person corresponding to a client terminal 1. The livestreaming content 140-2 may be the target answer of the livestreaming by the virtual person corresponding to a client terminal 2. The livestreaming content 140-3 may be supplementary content of the livestreaming by the virtual person corresponding to a client terminal 3, etc.

In some embodiments, the application scenario 100 of the system for livestreaming through the virtual person may further include a network (not shown), a storage device (not shown), or the like. The network may connect various components of the system and/or connect the system with external resources. The storage device may be configured to store data and/or instructions related to the application scenario 100 of the system for livestreaming through the virtual person. In some embodiments, the storage device may store data and/or information obtained from the server 110, the anchor terminal 120, the client terminal 130, or the like.

It should be noted that the application scenario 100 of the system for livestreaming through the virtual person is merely provided for the purpose of illustration, and not intended to limit the scope of the present disclosure. For those skilled in the art, various modifications and variations may be made to the processes under the teachings of the present disclosure. For example, the application scenario 100 of the system for livestreaming through the virtual person may achieve similar or different functions on other devices. However, those variations and modifications do not depart from the scope of the present disclosure.

Figure 2:
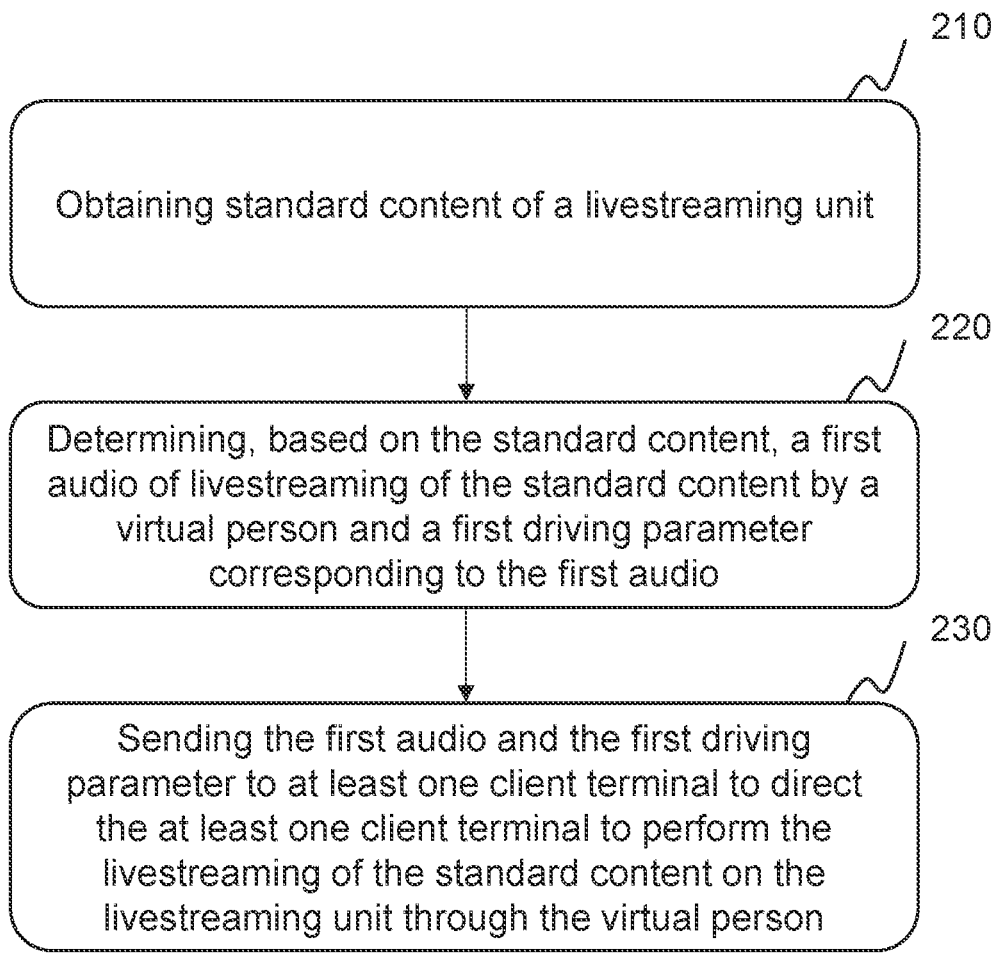
FIG. 2 is a flowchart illustrating an exemplary process for livestreaming according to some embodiments of the present disclosure.

FIG. 2 is a flowchart illustrating an exemplary process for livestreaming according to some embodiments of the present disclosure. In some embodiments, the process 200 may be performed by the server 110. As shown in FIG. 2, the process 200 may include the following operations.

In 210, standard content of a livestreaming unit may be obtained. In some embodiments, the operation 210 may be performed by a first obtaining module 610.

When livestreaming is performed through a virtual person, livestreaming content corresponding to the livestreaming may be a livestreaming queue. The livestreaming queue may be all the livestreaming content of the livestreaming.

The livestreaming queue may include one or more livestreaming units. The one or more livestreaming units may correspond to the one or more standard content, etc. The livestreaming unit may refer to part of the livestreaming through the virtual person. When the livestreaming is performed through the virtual person, at least one livestreaming unit may be livestreamed. In some embodiments, there may be a livestreaming sequence between different livestreaming units. The livestreaming sequence may be preset, for example, an anchor may set the livestreaming sequence through an input of an anchor terminal. In some embodiments, the livestreaming units may be differentiated according to the livestreaming content. For example, the livestreaming through a certain virtual person may be mainly to recommend a commodity. One livestreaming unit may correspond to one commodity. How many commodities are recommended by the virtual person may correspond to how many livestreaming units. For example, a count of livestreaming units may be 20, etc. In some embodiments, the livestreaming units may be differentiated according to important events. The important events may refer to events that users are more concerned about in the livestreaming, such as red envelope sending, shopping cart grabbing, etc. In some embodiments, different livestreaming units may correspond to different livestreaming times, livestreaming content, etc.

In some embodiments, different livestreaming units may correspond to different standard content. Standard content of a certain livestreaming unit may refer to content that needs to be introduced by the livestreaming on the livestreaming unit through the virtual person. The standard content may be in various forms, such as text, etc. For example, the standard content of a certain commodity may include text content that describes a use, a function, a price, etc. of the commodity.

In some embodiments, the server may obtain the standard content of the livestreaming unit in various ways. For example, the server may obtain the standard content of the livestreaming unit input by the anchor terminal. As another example, the server may obtain the standard content of the livestreaming unit of a storage device through the network, etc.

In some embodiments, while obtaining the livestreaming unit and the standard content thereof, other elements related to the livestreaming unit may also be obtained. For example, the anchor terminal may input other elements related to the content of the livestreaming through the anchor terminal. The other elements related to the content of the livestreaming may include a picture related to the content of the livestreaming (such as a picture of a commodity introduced by the livestreaming), a video (such as a video of a commodity introduced by the livestreaming), etc. When the livestreaming is performed on the livestreaming unit through the virtual person, the other elements related to the content of the livestreaming may be presented in a background of a livestreaming interface.

In some embodiments, the livestreaming unit may have a question and answer duration. The question and answer durations of different livestreaming units may be the same or different.

The question and answer duration may refer to a duration that the virtual person answers a question of a user for the livestreaming unit. For example, the question and answer duration of a certain livestreaming unit may be 5 minutes.

In some embodiments, the server may determine the question and answer duration in various ways. For example, the server may obtain the question and answer durations corresponding to different livestreaming units input by the anchor terminal. As another example, the server may automatically determine the question and answer duration according to the standard content of the livestreaming unit. For example, the more standard content, the longer the question and answer duration corresponding to the standard content. The less standard content, the shorter the question and answer duration corresponding to the standard content.

In some embodiments, the question and answer duration may be determined based on importance of the livestreaming unit and an audio duration of a first audio.

The importance of the livestreaming unit may refer to importance of the livestreaming content. For example, different livestreaming units may correspond to different commodities. The commodities may include a main commodity, a secondary commodity, a relatively important commodity, a common commodity, etc. The importance of the livestreaming units corresponding to the main commodity, the secondary commodity, the relatively important commodity, the common commodity, etc. may be reduced accordingly, such as most important, secondary important, relatively important, common important, etc.

In some embodiments, the server may determine the importance of the livestreaming unit in various ways. For example, the server may obtain the importance of different livestreaming units input by the anchor terminal. As another example, the server may determine the importance of the livestreaming units based on the livestreaming sequence of the livestreaming units. For example, the higher a livestreaming unit is ranked in the livestreaming sequence, the higher the importance of the livestreaming unit. As another example, the server may determine the importance of the livestreaming unit through a machine learning model (e.g., a scoring model, etc.). An input of the scoring model may include the livestreaming sequence, the standard content, etc. of the livestreaming unit. An output of the scoring model may determine a score of the importance of the livestreaming unit. The higher the score, the higher the importance of the livestreaming unit corresponding to the score.

The audio duration of the first audio may refer to a duration used by the virtual person to play the first audio. For example, the audio duration of the first audio may be 10 minutes, etc. Related description regarding the first audio may be found in the related description of the operation 220.

In some embodiments, the server may determine the corresponding question and answer duration based on the importance of the livestreaming unit and the audio duration of the first audio. For example, the importance of the livestreaming unit may be directly proportional to the question and answer duration. The higher the importance of the livestreaming unit, the longer the question and answer time corresponding to the livestreaming unit. As another example, the audio duration of the first audio may be directly proportional to the question and answer duration. The longer the audio duration of the first audio, the longer the question and answer duration corresponding to the first audio. In some embodiments, the server may comprehensively consider the importance of the livestreaming unit and the audio duration of the first audio to determine the question and answer duration of the corresponding livestreaming unit. For example, the server may preset correspondence between the importance of the livestreaming unit and the audio duration of the first audio and the question and answer duration of the corresponding livestreaming unit. The server may determine the question and answer duration of the corresponding livestreaming unit based on the above-mentioned correspondence. As another example, the server may convert the importance of the livestreaming unit into a first duration through a first conversion factor, convert the audio duration of the first audio into a second duration through a second conversion factor, and then weight the first duration and the second duration to determine a final question and answer duration. The first conversion factor and the second conversion factor may be preset. The weights of the first duration and the second duration may be flexibly determined based on an actual situation, for example, according to a type of a commodity, or a count of persons the livestreaming is for.

In some embodiments, the server may determine the corresponding question and answer duration through a duration determination model based on the importance of the livestreaming unit and the audio duration of the first audio. The duration determination model may be a machine learning model. An input of the duration determination model may include the importance of the livestreaming unit, the audio duration of the first audio, etc. An output of the duration determination model may include the question and answer duration of the livestreaming unit. The server may obtain a duration determination model through training based on a plurality of groups of first training samples and a label. Each group of the plurality of groups of first training samples may include importance of a sample livestreaming unit, an audio duration of a sample first audio, etc. The label may be an actual question and answer duration of the livestreaming unit corresponding to each group of the first training samples. The first training sample may come from first historical data for which a historical question and answer duration is set. A count of inquiries and answers to the commodity by automatic or manual customer service in the first historical data may be within a preset range. The first training sample may also come from second historical data for which a historical question and answer duration is not set. In this case, an actual question and answer duration in the label may be determined based on a count of inquiries and answers to the commodity by automatic or manual customer service.

In some embodiments of the present disclosure, the livestreaming unit may have a question and answer duration, so that the virtual person may have a certain time to answer the question of the user, which may be beneficial to improving interaction and interest between the virtual person and the user, thereby improving the user experience.

In some embodiments of the present disclosure, the question and answer duration may be determined based on the importance of the livestreaming unit and the audio duration of the first audio, which can ensure rationality of the determined question and answer duration, and can ensure that one or more questions of the user can be answered to a certain extent, thereby further enhancing the user experience.

In 220, the first audio of livestreaming of the standard content by the virtual person and a first driving parameter corresponding to the first audio may be determined based on the standard content. In some embodiments, the operation 220 may be performed by a determination module 620.

The first audio may refer to a synthesized audio corresponding to the standard content. The first audio may be an audio of livestreaming of the standard content by the virtual person. Different standard contents may correspond to different first audios.

In some embodiments, the server may convert, based on the standard content, the standard content into the first audio in various ways. For example, the server may convert the standard content into the first audio of the livestreaming of the standard content by the virtual person using a Text to Speech (TTS) technology.

The first driving parameter may refer to a parameter that changes in various parts of the virtual person during the livestreaming of the standard content by the virtual person. In some embodiments, the first audio may correspond to the first driving parameter based on a timestamp of the first audio. The server may determine the timestamps from vowels of the text in the standard content. For example, the first audio may be divided into timestamp 1, timestamp 2, timestamp 3, . . . , timestamp n based on vowel of the text. Each timestamp in the n timestamps may correspond to a set of driving parameters.

In some embodiments, a first driving parameter, a second driving parameter, and/or a third driving parameter may include at least one of an expression parameter, an action parameter, etc. Description regarding the second driving parameter and the third driving parameter may be found in the related description of FIG. 3 and FIG. 4.

The expression parameter may represent a parameter that changes in various facial parts of the virtual person. For example, the expression parameter may include a parameter about how much a mouth of the virtual person is open, how much eyebrows of the virtual person are raised, etc.

The action parameter may represent a parameter that changes in various body parts of the virtual person. For example, the action parameter may include a parameter about an action of an arm of the virtual person, etc.

In some embodiments, the server may determine, based on the first audio, the first driving parameter. For example, the mouth change may be determined based on pronunciation of each word in the standard content corresponding to the first audio. As another example, based on the first audio, emotion of the virtual person corresponding to each word in the standard content may be identified (for example, the server may identify emotion of the virtual person corresponding to each word through natural language processing (NLP)), and other changes in face (such as a part other than the mouth) corresponding to each word may be determined based on the emotion. As another example, based on the first audio, an action of the virtual person corresponding to each word may be identified (for example, the server may identify the action of the virtual person corresponding to each word through natural language processing (NLP)), and changes in other parts (such as a part other than the face) corresponding to each word may be determined based on the action of the virtual person.

In some embodiments, the first driving parameter corresponding to the first audio may be represented by an encoding sequence. The encoding sequence may include an expression parameter encoding sequence and an action parameter encoding sequence. The server may determine the expression parameter encoding sequence and the action parameter encoding sequence using time sequence of the first audio as a benchmark. The expression parameter encoding sequence and the action parameter encoding sequence may respectively represent expression parameters and action parameters corresponding to different timestamps of the first audio. Encoding values in the encoding sequence may represent changes in expressions or actions.

In some embodiments, various changes of various parts of the virtual person (such as a face, other limb parts, etc.) and the encoding values thereof may be preset (e.g., preset related data may be stored in a storage device). Based on the preset relationship, the server may determine, based on changes in each part determined by the first audio, an encoding value corresponding to the part. For example, a count of encoding values corresponding to the face may be multiple (e.g., 52, etc.). Different encoding values may represent changes in different muscle groups of the face. Taking opening and closing of the mouth of the face as an example, one of the 52 encoding values may represent the opening and closing of the mouth of the face. A size of the encoding value may represent different sizes of the opening and closing of the mouth. For example, when the encoding value is 1, it, may mean that the mouth of the virtual person is opened to maximum. When the code is 0, it may mean that the mouth of the virtual person is closed. When the code is 0.5, it may mean that the mouth of the virtual person is half open to maximum, etc.

In 230, the first audio and the first driving parameter may be sent to at least one client terminal to direct the at least one client terminal to perform the livestreaming of the standard content on the livestreaming unit through the virtual person. In some embodiments, the operation 230 may be performed by a sending module 630.

In some embodiments, the client terminal may include one or more client terminals. Different client terminals may correspond to different users. Different users may watch the livestreaming through the virtual person through the client terminals corresponding to the users.

In some embodiments, the server may send the first audio and the first driving parameter to the at least one client terminal through a network. The at least one client terminal may perform picture rendering, audio and video synthesis, etc. based on the obtained first audio of livestreaming of the standard content by the virtual person and the first driving parameter corresponding to the first audio, so that the livestreaming may be performed on a livestreaming unit corresponding to the first audio and the first driving parameter through the virtual person.

In some embodiments, the client terminal may adjust the obtained first driving parameter, and perform rendering and/or audio and video synthesis based on the adjusted first driving parameter.

In some embodiments, the client terminal may adjust the first driving parameter corresponding to the first audio based on preference of a user. For example, different users may have different preferences for a degree of exaggeration during the livestreaming of the virtual person, and the client terminal may fine-tune the first driving parameter based on the preference of the user. For example, when the user of a certain client terminal likes a relatively exaggerated expression of the virtual person, the client terminal may update a current encoding in a current first driving parameter. Action amplitudes of the mouth, the eyebrows, the arms, etc. corresponding to a new encoding may be one level greater than amplitudes corresponding to the current encoding.

In some embodiments, the client terminal may adjust the first driving parameter based on a livestreaming style preferred by the user. In some embodiments, the client terminal may determine, based on basic information, historical interaction data during historical livestreaming, historical purchase records, historical collection records, etc. of the user, the livestreaming style preferred by the user. The livestreaming style may include an active style, a quiet style, a cute style, a funny style, a sweet style, etc. For example, the livestreaming style preferred by a certain user may be the quiet style. The client terminal may update the current encoding in the current first driving parameter. Action amplitudes of the mouth, the eyebrows, the arms, etc. of the virtual person corresponding to a new encoding may be one level lower than amplitudes corresponding to the current encoding. In some embodiments, the client terminal may determine the livestreaming style preferred by the user through a livestreaming style determination model. The livestreaming style determination model may be a machine learning model. An input of the livestreaming style determination model may include the basic information, the historical interaction data during historical livestreaming, the purchase records, collection records, etc. of the user. An output of the livestreaming style determination model may include the livestreaming style preferred by the user. The client terminal may obtain the livestreaming style determination model through training based on a plurality of groups of second training samples and a label. Each group of the plurality of groups of second training samples may include basic information, historical interaction data during sample historical livestreaming, purchase records, collection records, etc. of a sample user. The label may be an actual livestreaming style preferred by the user corresponding to the each group of second training samples. The second training sample may be obtained based on historical data, and the label of the second training sample may be determined by manual labeling or automatic labeling. For example, the label may be a historical livestreaming style where a purchase quantity of the user is greater than a threshold.

In some embodiments, the client terminal may also determine to add other parameters based on the livestreaming style preferred by the user. The other parameters may refer to parameters other than the first driving parameter, for example, a parameter of background modification, etc. Different users may prefer different livestreaming styles. For example, some users may like a simple style of a livestreaming room. Some users may like a complex style of a livestreaming room, etc. In some embodiments, the client terminal may also select or dress up an image of the virtual person based on the livestreaming style preferred by the user. For example, the user may select a gender, a timbre, a hairstyle, clothes, accessories, etc. of the virtual person through the client terminal.

In some embodiments, if the livestreaming unit involves commodity displaying (for example, displaying a commodity purchase link, etc.), the client terminal may predict, based on the basic information, the interaction data in the livestreaming unit (the user asks questions, sends bullet comments, etc.), the historical purchase records, the historical collection records, etc. of the user, interest of the user in the displayed commodities. The client terminal may mark different commodities with different tags, or determine an order in which the displayed commodities are displayed based on the interest of the user in the displayed commodities. For example, the client terminal may sort the displayed commodities from top to bottom according to a degree of the interest.

In some embodiments, the client terminal may determine the interest of the user in the displayed commodity through an interest determination model. The interest determination model may be a machine learning model. An input of the interest determination model may include the basic information, the interaction data in the livestreaming unit, the historical purchase records, the historical collection records, etc. of the user. An output of the interest determination model may include the interest of the user in the displayed commodity. The client terminal may obtain the interest determination model through training based on a plurality of groups of third training samples and a label. Each group of the plurality of groups of third training samples may include basic information, interaction data in the livestreaming unit, historical purchase records, historical collection records, etc. of a sample user. The label may be an actual interest of the user in the displayed commodity corresponding to the each group of third training samples. The third training sample may be obtained based on historical data, and the label of the third training sample may be determined by manual labeling or automatic labeling. For example, the label may be determined by the purchase quantities the user has for different commodities. For example, the greater the purchase quantity of the commodity, the higher the interest of the corresponding commodity.

In some embodiments, during the livestreaming, the user may send a bullet comment through the client terminal. The bullet comment may include various content. For example, the bullet comment may include an expression, a review, a question, etc. sent by the user. The bullet comments sent by different client terminals may be synchronized. All client terminals may see the bullet comments sent by different client terminals.

In some embodiments, when the user sends a bullet comment, the server may determine a target answer to a target question in the bullet comment, and determine a second audio of livestreaming of the target answer to the target question by the virtual person and a second driving parameter corresponding to the second audio. The server may send the second audio and the second driving parameter to the client terminal to direct the client terminal to livestream the target answer through the virtual person. Further description regarding the livestreaming of the target answer by the virtual person may be found in the related description of FIG. 3.

In some embodiments of the present disclosure, the client terminal may perform rendering on the first audio and the first driving parameter sent to the client terminal. Personalized livestreaming may be performed for different users, which may make the livestreaming more flexible. For example, the first driving parameter may be adjusted based on the user, which may make the livestreaming of the virtual person more in line with the preference of the user. As another example, a question of the user may be answered, etc.

In some embodiments, if the client terminal completes the livestreaming of the standard content of the livestreaming unit, in response to determining that a remaining time for the question and answer duration in the client terminal satisfies a second preset condition, the server terminal may determine a third audio of supplementary content and a third driving parameter corresponding to the third audio; and send the third audio and the third driving parameter to the at least one client terminal to direct the at least one client terminal to livestream the supplementary content through the virtual person. The third audio of the supplementary content may need to be less than or equal to the remaining time of the question and answer duration in the client terminal. For example, the server may randomly obtain the third audio corresponding to the supplementary content and the third driving parameter corresponding to the third audio from a prefabricated library. The prefabricated library may be stored in the storage device. As another example, the anchor terminal may preset a plurality different supplementary content corresponding to different livestreaming units in advance. The server may obtain the supplementary content input by the anchor terminal. The server may determine, based on the supplementary content, the third audio of the livestreaming of the supplementary content by the virtual person and the third driving parameter corresponding to the third audio, and send the third audio and the third driving parameter to the client terminal. Further description regarding the remaining time of the question and answer duration in the client terminal may be found in the relevant description of the operation 320. Further description regarding the supplementary content of the livestreaming by the virtual person may be found in the related description in FIG. 4.

Figure 3:
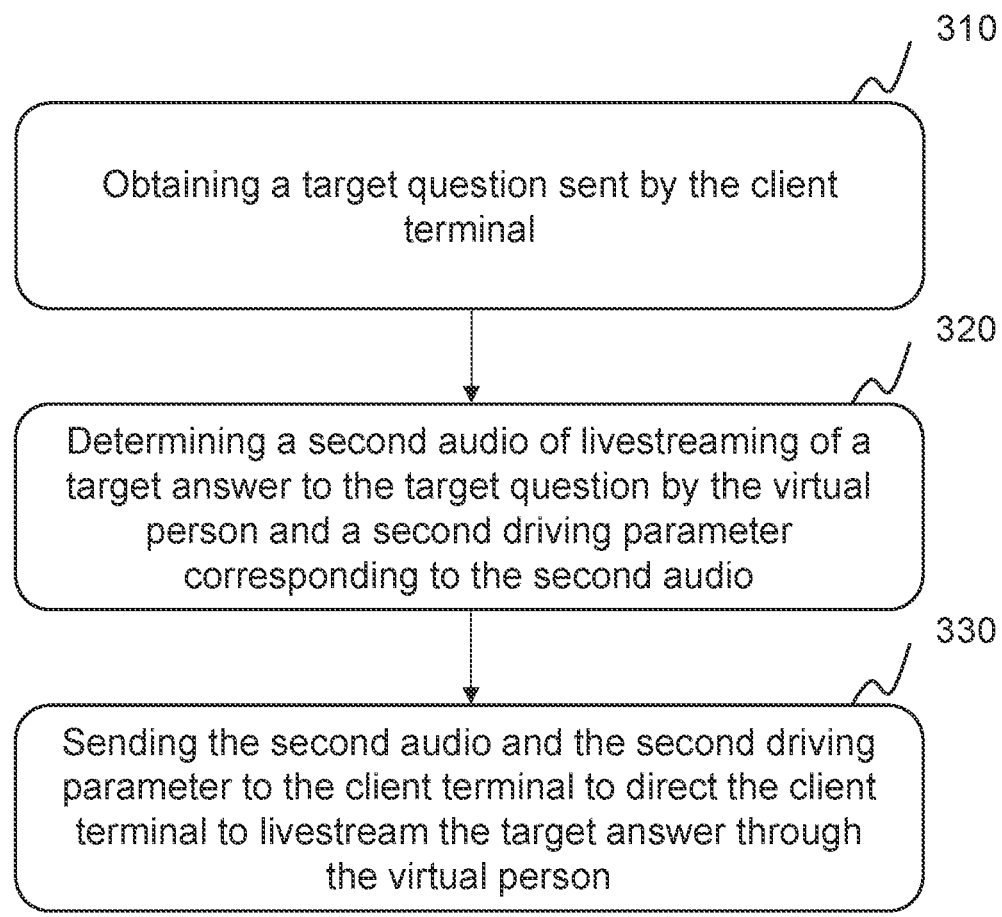
FIG. 3 is a flowchart illustrating an exemplary process for livestreaming a target answer through a virtual person according to some embodiments of the present disclosure.

FIG. 3 is a flowchart illustrating an exemplary process for livestreaming a target answer through a virtual person according to some embodiments of the present disclosure. As shown in FIG. 3, the process 300 may include the following operations.

In 310, a target question sent by the client terminal may be obtained. In some embodiments, the operation 310 may be performed by the first obtaining module 610.

The target question may a question related to a livestreaming unit. In some embodiments, the user watching the livestreaming through the virtual person may be one or more. As described in FIG. 2, different client terminals may correspond to different users. The target questions of the different client terminals may be the same or different.

In some embodiments, the target question may be determined based on an input of a user. When the user is watching standard content of the livestreaming unit, the user may leave a message in a bullet comment area in the form of text, voice, etc. through the client terminal at any time. The client terminal may identify the message in the bullet comment area in real time, then determine the target question in the message, and send the target question to the server. The client terminal may also send all the bullet comments to the server. The server may identify the target question.

In some embodiments, when the question is not related to the standard content of the livestreaming unit, the server may not answer the question. Alternatively, the server may answer based on prefabricated words. The prefabricated words may refer to an answer preset in advance for answering a question that is not related to the standard content of the livestreaming unit. For example, the prefabricated words may include "this question is not related to the topic of the livestreaming," "I don't know what to do," etc.

In some embodiments, the target question may be determined based on user feedback on candidate question presented by the client terminal. For example, the client terminal may identify the content of the livestreaming, determine keywords, and further determine a candidate question based on the keywords. For example, the keywords may include lipstick, color number, price, etc., and the client terminal may determine the candidate question based on the above keywords as "how does the color fade after the lipstick is applied?".

In some embodiments, the candidate questions for different client terminals may be different. In some embodiments, the candidate question for the client terminal may be determined based on information of the user of the client terminal. For example, the client terminal may determine, based on basic information of the user, historical interaction data between the user and the virtual person of livestreaming of a similar commodity through the virtual person, etc., a type of a question corresponding to the user. Further, the client terminal may determine the candidate question of the client terminal based on the type of the question corresponding to the user. For example, the type of the question corresponding to a user of a client terminal may be a price of a commodity. The client terminal may determine that the candidate question of the client terminal is "What is the price of the commodity?".

In some embodiments, the client terminal may determine the type of the question corresponding to the user through a question type determination model. The question type determination model may be a machine learning model. An input of the question type determination model may include the basic information of the user, the historical interaction data between the user and the virtual person of livestreaming of a similar commodity through the virtual person, etc. An output of the question type determination model may include the type of the question corresponding to the user. The client terminal may obtain the question type determination model based on the training of multiple sets of fourth training samples and labels. The client terminal may obtain the question type determination model through training based on a plurality of groups of fourth training samples and a label. Each group of the plurality of groups of fourth training samples may include basic information of a sample user, sample historical interaction data between the user and the virtual person of livestreaming of a similar commodity through the virtual person, etc. The label may be an actual type of the question corresponding to the user corresponding to each group of fourth training samples. The fourth training sample may be obtained based on historical data, and the label of the fourth training sample may be determined by manual labeling or automatic labeling.

In some embodiments, the client terminal may determine a hot question in real time, and designate the hot question as the candidate issue or directly as a target question. The hot question may refer to a question in which a count of bullet comments sent by a plurality of users for this question is greater than a count threshold within a period of time. The count threshold may be set in advance.

In some embodiments, when the user of the client terminal continuously raises a plurality questions, and a remaining time of a question and answer duration in the client terminal is relatively short, the client terminal may display the plurality questions raised by the user on a livestreaming interface during the livestreaming of the standard content. Based on feedback of the user on the plurality of questions displayed (e.g., feedback by clicking on the question, etc.), the target question may be determined. In some embodiments, the livestreaming interface may display all the consecutive questions raised by the user, or may display filtered questions. For example, an audio duration of a target answer corresponding to a question displayed may satisfy a first preset condition. In some embodiments, a sequence in which the consecutive questions are displayed may be related to a degree of relevance between the questions and the standard content. The more relevant a question is to the standard content of the livestreaming unit, the higher the question may be ranked in a display scheme. Further description regarding the remaining time of the question and answer duration in the client terminal and the first preset condition may be found in the relevant description of the operation 320.

In 320, a second audio of livestreaming of a target answer to the target question by the virtual person and a second driving parameter corresponding to the second audio may be determined. In some embodiments, the operation 320 may be performed by the determination module 620.

The target answer may refer to a final answer corresponding to the target question.

The second audio may refer to a synthesized audio corresponding to the target answer. The second audio may be an audio of livestreaming by the virtual person. The second driving parameter may refer to a parameter that changes in various parts of the virtual person during the livestreaming of the target answer by the virtual person.

In some embodiments, the audio duration of the second audio may need to satisfy the first preset condition. The audio duration of the second audio may refer to a duration used by the virtual person to play the second audio.

The first preset condition may refer to a condition that the audio duration of the target answer replied by the virtual person needs to satisfy when the virtual person interacts with the user. For example, the first preset condition may be that the audio duration of the second audio is less than a preset duration threshold, or the like.

In some embodiments, the server may determine the first preset condition based on the remaining time of the question and answer duration in the client terminal. For example, the server may directly designate the remaining time of the question and answer duration in the client terminal as the preset duration threshold. The first preset condition may be less than the preset duration threshold. As another example, the server may reduce the remaining time of the question and answer duration in the client terminal as the preset duration threshold. For example, 50% of the remaining time of the question and answer duration in the client terminal may be the preset duration threshold.

The remaining time of the question and answer duration in the client terminal may refer to a remaining question and answer duration in the livestreaming unit except for a duration that the virtual person has spent answering the question of the user in the client terminal. For example, a question and answer duration of a certain livestreaming unit may be 5 minutes. In client terminal A, if no question of the user has been answered by the virtual person, the remaining time of the question and answer duration in the client terminal A may be 5 minutes. In client terminal B, if two questions of the user has been already answered by the virtual person, and the audio duration of the second audio corresponding to the two questions is 30 seconds and 1 minute respectively, the remaining time of the question and answer duration in the client terminal B may be 3 minutes and 30 seconds. In client terminal C, if five questions of the user has been already answered by the virtual person, and the audio duration of the second audio corresponding to the five questions is 4 minutes in total, the remaining time for the question and answer duration in the client terminal C may be 1 minute. The server may determine that the first preset conditions corresponding to the client terminal A, the client terminal B, and the client terminal C are that the audio durations of the second audios are less than preset duration thresholds of 5 minutes, 3 minutes and 30 seconds, and 1 minute, respectively.

In some embodiments, the preset duration threshold in the first preset condition may be directly proportional to the remaining time of the question and answer duration in the client terminal. For example, the greater the remaining time of the question and answer duration in the client terminal, the greater the preset duration threshold in the first preset condition. As described in the above embodiment, the remaining time of the question and answer duration in the client terminal A, the client terminal B, and the client terminal C may gradually decrease. The first preset conditions corresponding to the client terminal A, the client terminal B, and the client terminal C may be that the audio duration of the second audio is less than a preset duration threshold of 1 minute, the audio duration of the second audio is less than a preset duration threshold of 50 seconds, and the audio duration of the second audio is less than a preset duration threshold of 20 seconds.

In some embodiments, the server may also preset correspondence between the first preset condition and the remaining time of the question and answer duration in the client terminal in other ways. The server may determine the first preset condition based on the correspondence and the remaining time of the question and answer duration in the client terminal.

In some embodiments, the server may determine the target answer corresponding to the target question sent by the client terminal through a question and answer knowledge base. The question and answer knowledge base may refer to a knowledge base that includes a plurality of different preset questions and answers corresponding to the plurality of different preset questions. The answer corresponding to a same preset question may include one or more answers. In some embodiments, the one or more answers may be answers with similar content and different expressions. The audio duration corresponding to the one or more answers may be different.

In some embodiments, the server may determine a target preset question whose relationship with the target question satisfies a preset requirement by matching the target question with the preset question in the question and answer knowledge base. The preset requirement may be a best match or a match degree being greater than a threshold. The server may determine an answer among answers corresponding to the target preset question as a target answer. The audio duration of the audio of the answer may satisfy the first preset condition.

In some embodiments, the server may determine a candidate answer to the target question. In response to determining that the audio duration of the candidate audio of the candidate answer satisfies the first preset condition, the candidate answer may be determined as the target answer, and the candidate audio may be designated as the second audio. In response to determining that the audio duration of the candidate audio of the candidate answer does not satisfy the first preset condition, the candidate answer may be redetermined until the audio duration of the candidate audio of the candidate answer satisfies the first preset condition.

The candidate answer may refer to an answer to be determined as the target answer corresponding to the target question. In some embodiments, the candidate answer may be an answer corresponding to a preset question whose similarity to the target question satisfies a third preset condition in the question and answer knowledge base. The third preset condition may include the similarity being greater than a similarity threshold or a greatest similarity, etc. For example, the candidate answer may be an answer corresponding to the target preset question in the question and answer knowledge base.

The candidate audio of the candidate answer may refer to the synthesized audio corresponding to the candidate answer. The audio duration of the candidate audio of the candidate answer may refer to a duration used by the virtual person to play the candidate audio.

In some embodiments, in response to determining that the audio duration of the candidate audio of the candidate answer satisfies the first preset condition, the server may determine the candidate answer as the target answer and designate the candidate audio as the second audio.

In some embodiments, in response to determining that the audio duration of the candidate audio does not satisfy the first preset condition, the server may need to redetermine the candidate answer until the audio duration of the candidate audio of the candidate answer satisfies the first preset condition. A sequence in which the server redetermines the candidate answers may be determined based on a count of words of a candidate answer, feedback of the user on a candidate answer, etc. For example, the server may first determine a candidate answer with a small count of words of the candidate answers. As another example, the server may first determine an answer that is fed back as a useful answer by the user. As yet another example, the server may determine the candidate answer, etc. by comprehensively considering the count of words of the candidate answer and the feedback of the user.

In some embodiments, the server may redetermine the candidate answer in various ways. The server may redetermine the candidate answer by replacing the candidate answer, pruning the candidate answer, deleting the candidate answer, or the like, or any combination thereof.

In some embodiments, when there are a plurality candidate answers, a candidate answer that does not satisfy the first preset condition may be replaced with a first new candidate answer, and it may be further determined whether the first new candidate answer satisfies the first preset condition. When the first new candidate answer does not satisfy the first preset condition, the first new candidate answer that does not satisfies the first preset condition may be replaced with a second new candidate answer, and it may be further determined whether the second new candidate answer satisfies the first preset condition until the audio duration of the candidate audio of a Nth new candidate answer satisfies the first preset condition. The first new candidate answer, the second new candidate answer, and the Nth new candidate answer may be different candidate answers among the plurality of candidate answers. When the audio duration of the candidate audio of the Nth new candidate answer satisfies the first preset condition, the server may determine the Nth new candidate answer as the candidate answer.

In some embodiments, the server may redetermine the candidate answer by pruning the candidate answer. For example, the server may identify a punctuation period in the candidate answer, prune at least one sentence in the candidate answer, and redetermine whether the candidate answer from which the at least one sentence is pruned satisfies the first preset condition. Pruning the at least one sentence in the candidate answer may be deleting from a last sentence forward according to a sequence of text of the candidate answer, until the audio duration of the candidate answer from which the at least one sentence is pruned satisfies the first preset condition. When the audio duration corresponding to the candidate answer from which the at least one sentence is pruned satisfies the first preset condition, the server may redetermine the candidate answer from which the at least one sentence is pruned as the candidate answer.

In some embodiments, the server may redetermine the candidate answer by deleting the candidate answer. For example, when there are no other answers in the question and answer knowledge base or there is only one sentence in the candidate answer and at least one sentence may not be pruned, the server may delete the candidate answer. The server may replace the candidate answer to the target question with some modal particles, actions (such as ha-ha, smiling, etc.), etc.

It should be noted that there is no restriction on a sequence of replacing the candidate answer, deleting the candidate answer, or deleting the candidate answer through the question-and-answer knowledge base. For example, the candidate answer may be pruned and then replaced, etc.

In some embodiments of the present disclosure, the candidate answer that satisfies the first preset condition may be determined as the target answer, which may effectively control the duration of answering each question by the virtual person and ensure a count of questions that the user can raise within the question and answer duration in the livestreaming unit, which can further improve the interaction efficiency and interest between the virtual person and the user, and enhance the user experience.

In 330, the second audio and the second driving parameter may be sent to the client terminal to direct the client terminal to livestream the target answer through the virtual person. In some embodiments, the operation 330 may be performed by the sending module 630.

In some embodiments, the server may send the second audio and the second driving parameter to the client terminal raising the target question through a network. The client terminal raising the target question may perform picture rendering, audio and video synthesis, etc. based on the received second audio and the second driving parameter. After livestreaming of a sentence of the current standard content through the virtual person is completed, the client terminal raising the target question may switch the livestreaming of the standard content to the livestreaming of the target answer corresponding to the target question sent by the client terminal through the virtual person. After the livestreaming of the target answer corresponding to the target question sent by the client terminal is completed, the livestreaming of the standard content of the livestreaming unit corresponding to the first audio and the first driving parameter through the virtual person may be switched back.

In some embodiments, the client terminal may determine, based on cohesion between the target answer and each different content of the standard content of subsequent livestreaming in the livestreaming unit, a time point for livestreaming of the target answer corresponding to the target question, i.e., a time point at which the livestreaming of the standard content is switched to the livestreaming of the target answer in the first audio. The cohesion may reflect a degree of connection between the target answer and different content. The cohesion may be represented by semantic similarity or semantic coherence. The higher the degree of connection between the target answer and a certain content, the less obtrusive it may be to livestream the target answer at a time point before or after the livestreaming of the content. For example, the client terminal may predict the time point for the livestreaming of the target answer corresponding to the target question using a prediction model. The prediction model may be a machine learning model, such as a bidirectional encoder representations from transformers (BERT) model, etc. An input of the prediction model may include text of the target answer, text of the standard content of the subsequent livestreaming in the livestreaming unit, etc. An output of the prediction model may include the time point for the livestreaming of the target answer corresponding to the target question. The prediction model may be obtained through training based on the plurality of groups of fifth training samples and a label. Each group of the plurality of groups of fifth training samples in groups of fifth training samples may include the text of the sample target answer and the text of the standard content of the subsequent livestreaming in the sample livestreaming unit. The label may be an actual time point for the livestreaming of the target answer corresponding to the target question corresponding to each group of the fifth training samples. The fifth training sample may be obtained based on historical data, and the label of the fifth training sample may be determined by manual labeling or automatic labeling.

The target questions sent by different client terminals may be different. The second audios and the second driving parameters corresponding to the target questions may be different. The content of the livestreaming of the target answers corresponding to the target questions sent by different client terminals through the virtual person may be also different.

In some embodiments of the present disclosure, for the target questions sent by different client terminals, the livestreaming of the target answers corresponding to the target questions may be performed by the virtual persons of different client terminals, so that only the user who raises the target question may receive the target answer to the target question. The rendering of the client terminal may be a one-to-one interactive picture. At the same time, virtual persons of different client terminals may answer the target questions of different users or perform livestreaming on the livestreaming unit, etc., and one-to-one communication and exchange between the virtual persons of different client terminals and each user may be realized, which can further improve the interaction efficiency and interest between the virtual person and the user and enhance attractiveness and audience care of the livestreaming content in the livestreaming room of the virtual person.

Figure 4:
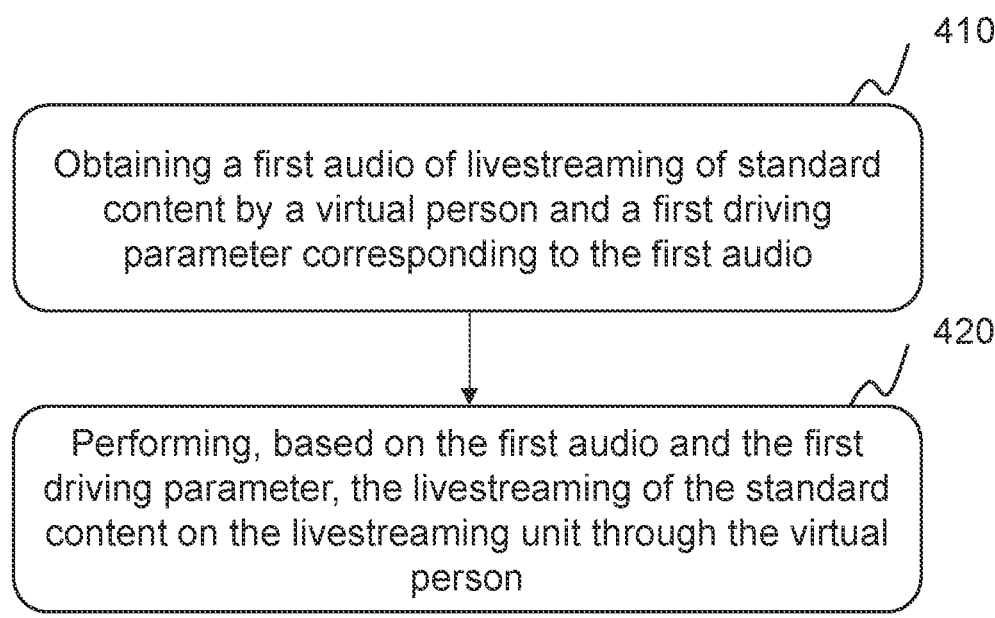
FIG. 4 is a flowchart illustrating another exemplary process for livestreaming according to some embodiments of the present disclosure.

FIG. 4 is a flowchart illustrating another exemplary process for livestreaming according to some embodiments of the present disclosure. As shown in FIG. 4, the process 400 may include the following operations.

In 410, a first audio of livestreaming of standard content by a virtual person and a first driving parameter corresponding to the first audio may be obtained. In some embodiments, the operation 410 may be performed by a second obtaining module 640.

In some embodiments, a client terminal may obtain obtaining the first audio of livestreaming of standard content by the virtual person and the first driving parameter corresponding to the first audio. The standard content may be livestreaming content of a livestreaming unit. Further description of the above may be found in the related description of FIG. 2.

In some embodiments, the first driving parameter may include at least one of an expression parameter or an action parameter. Further description of the above may be found in the related description of FIG. 2.

In some embodiments, the livestreaming unit may have a question and answer duration. The client terminal may determine the question and answer duration based on importance of the livestreaming unit and the audio duration of the first audio. Further description of the above may be found in the related description of FIG. 2.

In 420, the livestreaming of the standard content on the livestreaming unit may be performed based on the first audio and the first driving parameter through the virtual person. In some embodiments, the operation 420 may be performed by a livestreaming module 650.

In some embodiments, the client terminal may perform the livestreaming on the livestreaming unit through the virtual person based on the first audio and the first driving parameter. Further description of the above may be found in the related description of FIG. 2.

In some embodiments, the client terminal may send a target question; obtain a second audio of livestreaming of a target answer to the target question through the virtual person and a second driving parameter corresponding to the second audio; and livestream, based on the second audio and the second driving parameter, the target answer through the virtual person. An audio duration of the second audio may satisfy a first preset condition. The first preset condition may be determined based on a remaining time of the question and answer duration for the question in the client terminal. Further description of the above may be found in the related description of FIG. 3.

In some embodiments, the client terminal may switch the livestreaming of the standard content through the virtual person to the livestreaming of the target answer through the virtual person; and in response to determining that the livestreaming of the target answer is completed, switch back to the livestreaming of the standard content. Further description of the above may be found in the related description of FIG. 3.

In some embodiments, when the livestreaming of the standard content is completed, in response to determining that the remaining time of the question and answer duration in the client terminal satisfies a second preset condition, the client terminal may obtain a third audio of supplementary content and a third driving parameter corresponding to the third audio. The client terminal may livestream, based on the third audio and the third driving parameter, the supplementary content through the virtual person.

The second preset condition may refer to a condition that needs to be satisfied by the livestreaming of the supplementary content when the livestreaming of the standard content is completed through the virtual person. For example, the second preset condition may be that the remaining time of the question and answer duration in the client terminal is greater than a preset remaining time threshold, etc. The preset remaining time threshold may refer to a minimum value of the remaining time of the question and answer duration in the client terminal, such as 0 seconds, 10 seconds, etc.

The supplementary content may refer to content for supplementing a duration in which there is no corresponding livestreaming content in the livestreaming unit. The supplementary content included may be one or more. Different supplementary content may correspond to different playback durations. The duration in which there is no corresponding livestreaming content in the livestreaming unit may refer to a last question and answer duration of the livestreaming unit.

The third audio may refer to a synthesized audio corresponding to the supplementary content. The third driving parameter may refer to a parameter related to driving the livestreaming of the supplementary content through the virtual person.

In some embodiments, when the remaining time of the question and answer duration in the client terminal satisfies the second preset condition, the client terminal may obtain the supplementary content in various ways. For example, the client terminal may randomly obtain the supplementary content through a prefabricated library that exists locally. As another example, the client terminal may use an answer to a hot question as the supplementary content for the client terminal who does not raise the question. Further description regarding the hot question may be found in the related description in FIG. 3.

In some embodiments, the client terminal may obtain, based on the supplementary content, the third audio of the supplementary content and the third driving parameter corresponding to the third audio. The determining the third audio of the supplementary content and the third driving parameter corresponding to the third audio may be similar to the determining the first audio of the livestreaming of the standard content by the virtual person and the first driving parameter corresponding to the first audio in the operation 220. Further description may be found in the related description of the operation 220.

In some embodiments, the client terminal may perform picture rendering, audio and video synthesis, etc. based on the third audio and the third driving parameter, so that the supplementary content corresponding to the third audio and the third driving parameter may be livestreamed by the virtual person.

In some embodiments of the present disclosure, the supplementary content may be livestreamed by the virtual person, so that the time points when different client terminals enter the next livestreaming unit may be synchronized, thereby ensuring that a start time of each livestreaming unit in different client terminals is synchronized. For example, the start time of the livestreaming unit may be an occurrence time of an important event (such as red envelope sending, shopping cart grabbing, etc.). Through the supplementary content, it may ensure that different client terminals are synchronized during important events, and can participate in grabbing red envelopes, grabbing commodities, etc., to avoid the client terminals from missing important events, which is beneficial to enhance the user experience.

Figure 5:
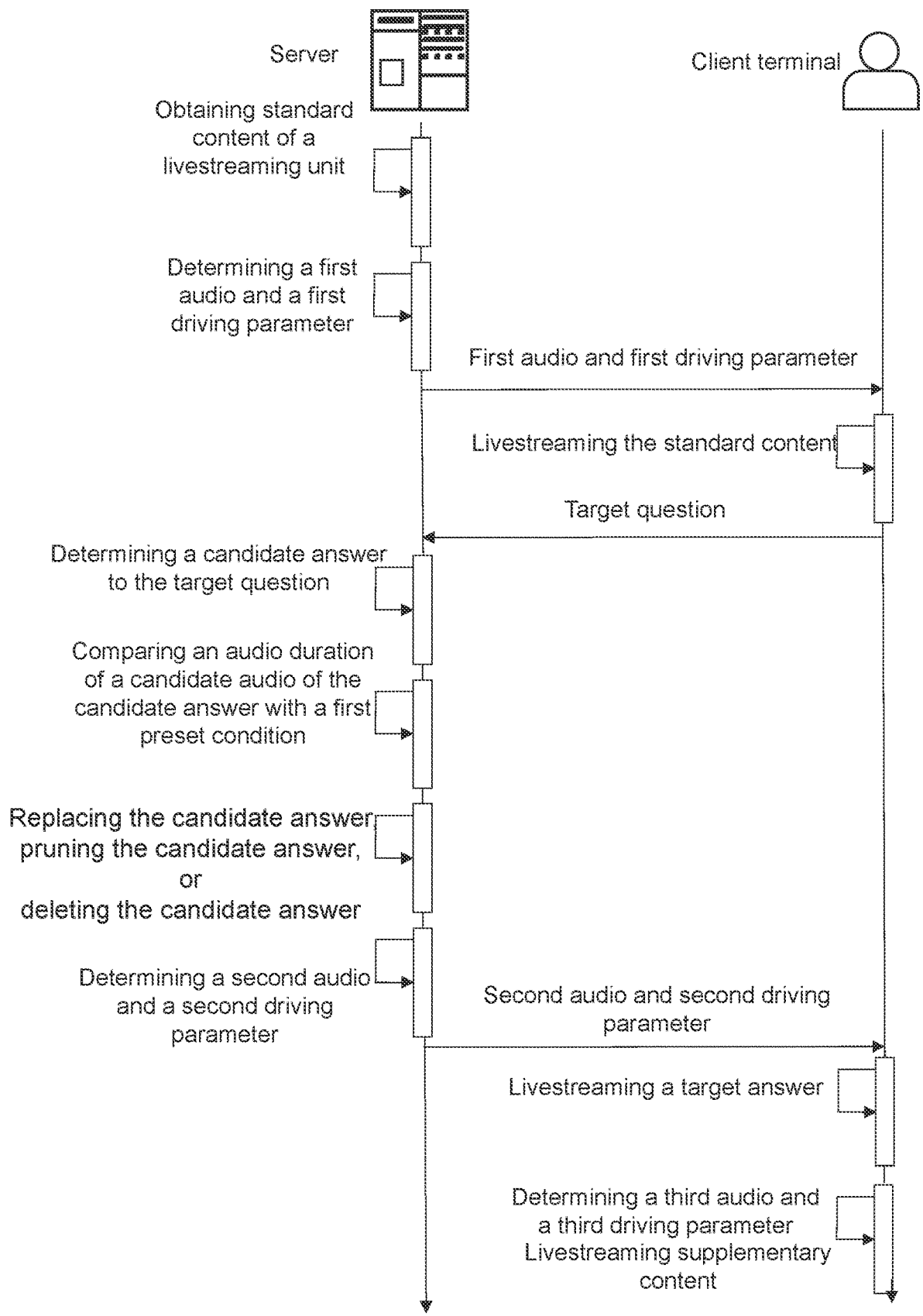
FIG. 5 is a schematic diagram illustrating an exemplary process for performing livestreaming on a livestreaming unit through a virtual person according to some embodiments of the present disclosure.

FIG. 5 is a schematic diagram illustrating an exemplary process for performing livestreaming on a livestreaming unit through a virtual person according to some embodiments of the present disclosure.

As shown in FIG. 5, the server may obtain standard content of the livestreaming unit. The server may determine, based on the standard content, a first audio of livestreaming of the standard content by the virtual person and a first driving parameter corresponding to the first audio. The server may send the first audio and the first driving parameter to at least one client terminal. Further description of the above may be found in the related description of FIG. 2.

The client terminal may obtain the first audio of livestreaming of the standard content by the virtual person and the first driving parameter, and perform the livestreaming of the standard content on the livestreaming unit through the virtual person. Further description of the above content may be found in the related description of FIG. 2.

During the livestreaming, a user may leave a message in a bullet comment area in the form of text through the client terminal. The client terminal may identify the message in the bullet comment area in real time, and then determine a question in the message. The client terminal may send the determined target question to the server. Further description of the above may be found in the related description of FIG. 3.

The server can obtain the target question sent by the client terminal, and determine a candidate answer to the target question. The server may compare whether an audio duration of a candidate audio of the candidate answer satisfies a first preset condition. In response to determining that the audio duration of the candidate audio of the candidate answer satisfies the first preset condition, the server may determine the candidate answer as the target answer and designate the candidate audio as the second audio. In response to determining that the audio duration of the candidate audio of the candidate does not satisfy the first preset condition, the server may redetermine the candidate answer until the audio duration of the candidate audio of the candidate answer satisfies the first preset condition. The server may redetermine the candidate answer by replacing the candidate answer, deleting the candidate answer, deleting the candidate answer, or the like, or any combination thereof. The server may determine the second audio of livestreaming of the target answer to the target question by the virtual person and a second driving parameter corresponding to the second audio and send the second audio and the second driving parameter to the corresponding client terminal. Further description of the above may be found in the related description of FIG. 3.

The client terminal may obtain the second audio of livestreaming of the target answer to the target question of the client terminal by the virtual person and the second driving parameter corresponding to the second audio and livestream the target answer through the virtual person. Not all client terminals may obtain the second audio of the livestreaming of the target answer to the target question and the second driving parameter corresponding to the second audio, but only the client terminal that raises the target question may obtain the second audio and the second driving parameter. In the above manner, a one-to-one livestreaming picture between the virtual person and the user may be realized. A livestreaming interface of the client terminal of each use may be different. The client terminal may switch the livestreaming of the standard content through the virtual person to the livestreaming of the target answer through the virtual person. In response to determining that the livestreaming of the target answer is completed, the client terminal may switch back to the livestreaming of the standard content. The livestreaming interfaces of other client terminals may not be affected. Further description regarding the above content may be found in the related description of FIG. 3.

When the livestreaming of the standard content is completed, in response to determining that the remaining time of the question and answer duration in the client terminal satisfies the second preset condition, the client terminal may obtain a third audio of supplementary content and a third driving parameter corresponding to the third audio. The client terminal may livestream, based on the third audio and the third driving parameter, the supplementary content through the virtual person. Further description of the above may be found in the related description of FIG. 4.

It should be noted that the above description about the process is merely for example and illustration, and not intended to limit the scope of application of the present disclosure. For those skilled in the art, various modifications and variations may be made to the processes under the teachings of the present disclosure. However, those modifications and variations do not depart from the scope of the present disclosure.

Figure 6:
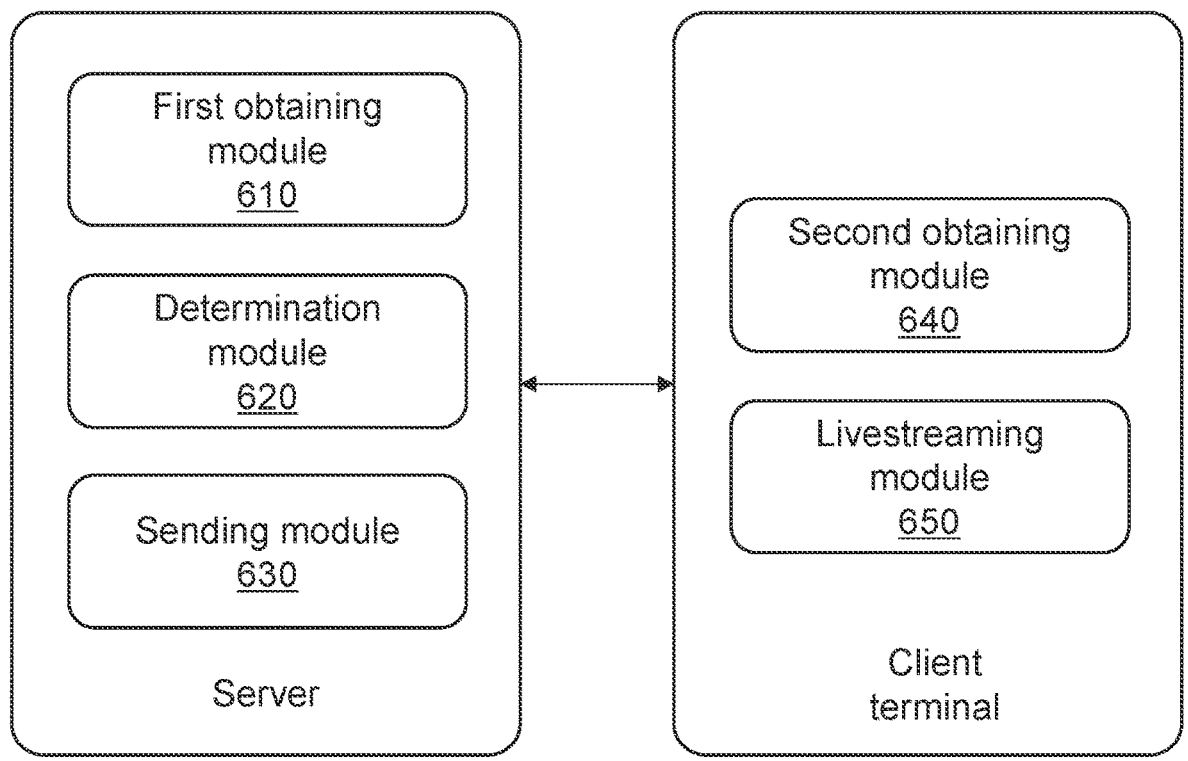
FIG. 6 is a block diagram illustrating an exemplary system for livestreaming according to some embodiments of the present disclosure.

FIG. 6 is a block diagram illustrating an exemplary system for livestreaming according to some embodiments of the present disclosure.

As shown in FIG. 6, the system 600 for livestreaming may include the first obtaining module 610, the determination module 620, the sending module 630, the second obtaining module 640, and the livestreaming module 650. The first obtaining module 610, the determination module 620, and the sending module 630 may be modules of a server. The second obtaining module 640 and the livestreaming module 650 may be modules of a client terminal.

In some embodiments, the first obtaining module 610 may be configured to obtain standard content of a livestreaming unit.

In some embodiments, the determination module 620 may be configured to determine, based on the standard content, a first audio of livestreaming of the standard content by a virtual person and a first driving parameter corresponding to the first audio.

In some embodiments, the sending module 630 may be configured to send the first audio and the first driving parameter to at least one client terminal to direct the at least one client terminal to perform the livestreaming of the standard content on the livestreaming unit through the virtual person.

In some embodiments, the livestreaming unit may have question and answer duration.

In some embodiments, the first obtaining module 610 may be further configured to determine the question and answer duration based on importance of the livestreaming unit and an audio duration of the first audio.

In some embodiments, for one of the at least one client terminal, the first obtaining module 610 may be further configured to obtain a target question sent by the client terminal. The determination module 620 may be further configured to determine a second audio of livestreaming of a target answer to the target question by the virtual person and a second driving parameter corresponding to the second audio. The sending module 630 may be further configured to send the second audio and the second driving parameter to the client terminal to direct the client terminal to livestream the target answer through the virtual person. An audio duration of the second audio may satisfy a first preset condition, and the first preset condition may be determined based on a remaining time of the question and answer duration for the question in the client terminal.

In some embodiments, the determination module 620 may be further configured to determine a candidate answer to the target question; in response to determining that an audio duration of a candidate audio of the candidate answer satisfies the first preset condition, determine the candidate answer as the target answer and designate the candidate audio as the second audio; or in response to determining that the an audio duration of the candidate audio of the candidate does not satisfy the first preset condition, redetermine the candidate answer until the audio duration of the candidate audio of the candidate answer satisfies the first preset condition.

In some embodiments, the determination module 620 may be further configured to at least one of replace the candidate answer, prune the candidate answer, or delete the candidate answer.

In some embodiments, the second obtaining module 640 may be configured to obtain the first audio of livestreaming of standard content by the virtual person and the first driving parameter corresponding to the first audio. The standard content may be livestreaming content of the livestreaming unit.

In some embodiments, the livestreaming module 650 may be configured to perform, based on the first audio and the first driving parameter, the livestreaming of the standard content on the livestreaming unit through the virtual person.

In some embodiments, the livestreaming module 650 may be further configured to send the targeted question; obtain the second audio of livestreaming of the target answer to the target question through the virtual person and the second driving parameter corresponding to the second audio; and livestream, based on the second audio and the second driving parameter, the target answer through the virtual person. The audio duration of the second audio may satisfy the first preset condition, and the first preset condition may be determined based on the remaining time of the question and answer duration for the question in the client terminal.

In some embodiments, the livestreaming module 650 may be further configured to switch the livestreaming of the standard content through the virtual person to the livestreaming of the target answer through the virtual person; and in response to determining that the livestreaming of the target answer is completed, switch back to the livestreaming of the standard content.

In some embodiments, the livestreaming module 650 may be further configured to when the livestreaming of the standard content is completed, in response to determining that the remaining time of the question and answer duration in the client terminal satisfies a second preset condition, obtain a third audio of supplementary content and a third driving parameter corresponding to the third audio; and livestream, based on the third audio and the third driving parameter, the supplementary content through the virtual person.

In some embodiments, the first driving parameter may include at least one of an expression parameter or an action parameter.

It should be understood that the system and the modules thereof shown in FIG. 6 may be implemented in various ways. For example, in some embodiments the system and the modules thereof may be implemented entirely by hardware, software, or by combining software and hardware implementation.

It should be noted that the above description of the system and the modules thereof is merely for the convenience of description, and not intended to limit the present disclosure to the scope of the illustrated embodiments. It can be understood that for those skilled in the art, after understanding the principle of the system, it is possible to arbitrarily combine various modules or form a subsystem to connect with other modules without departing from the principle. In some embodiments, the first obtaining module 610, the determination module 620, the sending module 630, the second obtaining module 640, and the livestreaming module 650 disclosed in FIG. 6 may be different modules in a system, or may be one module to implement functions of the two or more modules. For example, each module may share a storage module, and each module may also have its own storage module. Such variations are all within the protection scope of the present disclosure.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for livestreaming implemented on a server including one or more processors and one or more storage devices, comprising:
  obtaining standard content of a livestreaming unit; wherein the livestreaming unit has a question and answer duration, the question and answer duration is determined based on importance of the livestreaming unit and an audio duration of a first audio, different commodities correspond to the importance of different livestreaming units and different question and answer durations, and the importance of the livestreaming unit is directly proportional to the question and answer duration;
  determining, based on the standard content, the first audio of livestreaming of the standard content by a virtual person and a first driving parameter corresponding to the first audio; and
  sending the first audio and the first driving parameter to at least one client terminal to direct the at least one client terminal to perform the livestreaming of the standard content on the livestreaming unit through the virtual person; wherein
  for one of the at least one of client terminal,
    obtaining a target question sent by the client terminal, the target question being determined based on user feedback on a candidate question presented by the at least one client terminal, and the candidate question for different client terminals being different;
    determining a second audio of livestreaming of a target answer to the target question by the virtual person and a second driving parameter corresponding to the second audio; and
    sending the second audio and the second driving parameter to the client terminal to direct the client terminal to livestream the target answer through the virtual person, wherein
      an audio duration of the second audio satisfies a first preset condition, and the first preset condition is determined based on a remaining time of the question and answer duration for the target question in the client terminal.

2. The method of claim 1, wherein determining the second audio includes:
  determining a candidate answer to the target question;
  in response to determining that an audio duration of a candidate audio of the candidate answer satisfies the first preset condition,
    determining the candidate answer as the target answer; and
    designating the candidate audio as the second audio; or
  in response to determining that the audio duration of the candidate audio of the candidate answer does not satisfy the first preset condition, redetermining the candidate answer until the audio duration of the candidate audio of the candidate answer satisfies the first preset condition.

3. The method of claim 2, wherein redetermining the candidate answer includes at least one of:
  replacing the candidate answer,
  pruning the candidate answer, or
  deleting the candidate answer.

4. The method of claim 1, wherein the first driving parameter includes at least one of an expression parameter or an action parameter.

5. The method of claim 1, further comprising:
  adjusting, based on a livestreaming style preferred by a user, the first driving parameter corresponding to the first audio.

6. The method of claim 1, wherein in response to determining that the livestreaming unit involves commodity displaying, the at least one client terminal predicts, based on basic information, interaction data in the livestreaming unit, historical purchase records, historical collection records, etc. of a user, interest of the user in displayed commodities, the at least one client terminal marking different commodities with different tags, or determining an order in which the displayed commodities are displayed based on the interest of the user in the displayed commodities.

7. A method for livestreaming implemented on a client terminal including one or more processors and one or more storage devices, comprising:
  obtaining a first audio of livestreaming of standard content by a virtual person and a first driving parameter corresponding to the first audio, the standard content being livestreaming content of a livestreaming unit; wherein the livestreaming unit has a question and answer duration, the question and answer duration is determined based on importance of the livestreaming unit and an audio duration of the first audio, different commodities correspond to the importance of different livestreaming units and different question and answer durations, and the importance of the livestreaming unit is directly proportional to the question and answer duration; and
  performing, based on the first audio and the first driving parameter, the livestreaming of the standard content on the livestreaming unit through the virtual person; wherein
    obtaining a target question sent by the client terminal, the target question being determined based on user feedback on a candidate question presented by the client terminal, and the candidate question for different client terminals being different;
    determining a second audio of livestreaming of a target answer to the target question by the virtual person and a second driving parameter corresponding to the second audio; and
    sending the second audio and the second driving parameter to the client terminal to direct the client terminal to livestream the target answer through the virtual person, wherein
      an audio duration of the second audio satisfies a first preset condition, and the first preset condition is determined based on a remaining time of the question and answer duration for the target question in the client terminal.

8. The method of claim 7, wherein livestreaming the target answer through the virtual person includes:
  switching the livestreaming of the standard content through the virtual person to the livestreaming of the target answer through the virtual person; and
  in response to determining that the livestreaming of the target answer is completed, switching back to the livestreaming of the standard content.

9. The method of claim 7, wherein
  when the livestreaming of the standard content is completed, in response to determining that the remaining time of the question and answer duration in the client terminal satisfies a second preset condition, obtaining a third audio of supplementary content and a third driving parameter corresponding to the third audio; and livestreaming, based on the third audio and the third driving parameter, the supplementary content through the virtual person.

10. The method of claim 7, wherein the first driving parameter includes at least one of an expression parameter or an action parameter.

11. A system for livestreaming, comprising:
at least one storage device configured to store a set of instructions; and
at least one processor configured to communicate with the at least one storage device, wherein when executing the set of instructions, the at least one processor is configured to cause the system to perform operations including:
obtaining standard content of a livestreaming unit; wherein the livestreaming unit has a question and answer duration, the question and answer duration is determined based on importance of the livestreaming unit and an audio duration of a first audio, different commodities correspond to the importance of different livestreaming units and different question and answer durations, and the importance of the livestreaming unit is directly proportional to the question and answer duration;
determining, based on the standard content, the first audio of livestreaming of the standard content by a virtual person and a first driving parameter corresponding to the first audio; and
sending the first audio and the first driving parameter to at least one client terminal to direct the at least one client terminal to perform the livestreaming of the standard content on the livestreaming unit through the virtual person; wherein
for one of the at least one of client terminal,
obtaining a target question sent by the client terminal, the target question being determined based on user feedback on a candidate question presented by the at least one client terminal, and the candidate question for different client terminals being different;
determining a second audio of livestreaming of a target answer to the target question by the virtual person and a second driving parameter corresponding to the second audio; and
sending the second audio and the second driving parameter to the client terminal to direct the client terminal to livestream the target answer through the virtual person, wherein
an audio duration of the second audio satisfies a first preset condition, and the first preset condition is determined based on a remaining time of the question and answer duration for the target question in the client terminal.

12. The system of claim 11, wherein determining the second audio includes:
determining a candidate answer to the target question;
in response to determining that an audio duration of a candidate audio of the candidate answer satisfies the first preset condition;
determining the candidate answer as the target answer; and
designating the candidate audio as the second audio; or
in response to determining that the an audio duration of the candidate audio of the candidate does not satisfy the first preset condition, redetermining the candidate answer until the audio duration of the candidate audio of the candidate answer satisfies the first preset condition.

13. The system of claim 12, wherein redetermining the candidate answer includes at least one of:
replacing the candidate answer,
pruning the candidate answer, or
deleting the candidate answer.

* * * * *